United States Patent Office 3,009,802
Patented Nov. 21, 1961

3,009,802
DEFLAGRATION COMPOSITION
Ernest H. Lyons, Jr., Elsah, Ill., assignor to Chromalloy Corporation, Edwardsville, Ill., a corporation of New York
No Drawing. Filed Dec. 3, 1959, Ser. No. 856,917
3 Claims. (Cl. 52—23)

This invention relates to deflagratory compositions.

There are numerous applications for a material which is substantially insensitive to shock but which will deflagrate within a predetermined time interval at or above a critical temperature. For example, such a material may be used to signal the overheating of a moving part, such as a shaft in a journal, or to trigger a series of operations in apparatus which is subjected to shock, but normally not to high temperatures.

One of the objects of this invention is to provide a material which will deflagrate within a predetermined time interval at or above a critical temperature.

Other objects will become apparent to those skilled in the art in the light of the following description.

For certain military applications, it is desirable to have a material which can be made to deflagrate in a short but appreciable time interval (e.g. 1–5 seconds) at a moderate (e.g. 300–400° F.) temperature. In accordance with this invention generally stated, a composition comprising a metal oxalate and a sensitizer is provided, which will deflagrate at or above about 285–300° F., within a suitable time range, which may be varied with the particular composition.

It has been known for many years that silver oxalate decomposes spontaneously at elevated temperatures. Pure silver oxalate, however, is unsuited to use in applications in which consistently short times for deflagration at temperatures in the neighborhood of 350° F. are desired. Other metal oxalates, in particular cuprous oxalate and mercurous oxalate, have been known to be capable of spontaneous decomposition.

I have found that the addition of carbon, preferably in the form of activated charcoal, to metallic oxalates, produces compositions which are stable to shock and in storage, and which deflagrate within a time interval range of 1 to 5 seconds at 350° F. Among the metallic oxalates which have been tested are cuprous oxalate, mercurous oxalate, and mercuric oxalate.

As an example, silver oxalate was prepared by adding a solution of reagent grade silver nitrate to a solution of reagent grade sodium oxalate. The silver oxalate precipitate was washed twice by decantation and filtered on a Buchner filter, and washed once, and then dried overnight at 80° C. The silver oxalate powder was somewhat brown, probably because of the temperature of drying; silver oxalate precipitated in other tests, dried at 70° C. was white, but showed the same period of deflagration as the brown product.

A portion of the silver oxalate powder was compounded with 3%, by weight of the silver oxalate, of 80 mesh activated coconut charcoal, by intimately admixing the two. This was called sample A.

Another portion of the silver oxalate powder was compounded with 9%, by weight of the silver oxalate, of the activated coconut charcoal. This was sample B.

A third portion of the silver oxalate powder was compounded with 20%, by weight of the silver oxalate, of the activated coconut charcoal. This was sample C.

Four separate portions, each weighing 0.100 g. ±0.002 g., were taken from each of the samples A, B, and C. Each of the separate portions was placed in a separate, cadmium plated steel ogive. The ogives were thimble-sized, open topped containers, the wall of which was approximately 0.050 inch thick. The portions of the compositions were then pressed, at 30,000 lbs. per square inch, in an arbor press, into the restricted end of the ogives.

The loaded ogives were placed in a test fixture, and lowered quickly over a solder bath maintained at 350° F. ±2° F., until the ogive touched the solder.

A stopwatch was started when the ogive touched the solder, and stopped when there was an explosion.

The results are set forth in the following table:

| Sample: | Time for deflagration in seconds |
|---|---|
| A | 3.4; 4.0; 4.0; 5.2 |
| B | 3.4; 3.2; 2.4; 3.0 |
| C | 2.4; 2.2; 2.6; 2.4 |

The uniformity of the results obtained is all the more remarkable because the powder was loosely pelletized, and in a few cases the pellets fell apart into several pieces. It cannot be assumed that there was good contact with the plated steel surface of the ogive.

In tests carried out under the same conditions with pure silver oxalate, deflagration times of from 6 to 7.2 seconds were obtained. With mixtures of silver oxalate and iron, times of between 8 and 11 seconds were obtained. With silver oxalate and silver azide, the times of deflagration varied from 38 to 65 seconds, although the reactions when they occurred were violent. Silver oxalate with ammonium dichromate deflagrated in times ranging from 6.5 to 19.0 seconds. In each instance, mixtures of silver oxalate with 3%, with 9%, and with 20% of the "sensitizer" were tested.

The silver oxalate-carbon compound, samples A, B and C were stable to shock. They were placed on a steel anvil and hammered with a sledge, without producing any decomposition.

It is to be observed that of all the "sensitizers" added, only carbon cut the time required to deflagrate the composition, and produced relatively uniform results.

While the theory of the action of the material of this invention does not form a part of the invention, it is thought that the acceleration of the reaction by the carbon may be the result of production of nuclei in the crystals of silver oxalate, by reduction of silver ions at points of contact of the activated carbon and the oxalic oxalate crystals, but the absorption of inhibiting ions such as nitrate may also be a factor.

In the preparation of the silver oxalate, it is preferred that there be no excess of either reagent at any time during the precipitation. An excess of nitrate ion has a markedly inhibiting effect upon the deflagration of the silver oxalate.

The deflagration time can be reduced still further by irridating the silver oxalate either before or after it is compounded with the carbon. The irridation can be carried out either in sunlight or under a fluorescent lamp.

The deflagration time is not only reduced by higher temperatures, but is made even more consistent, so that at 400° F., for example, with 20% carbon, as in sample C, the deflagration time is consistently between 1 and 2 seconds.

Mercuric oxalate, to which activated coconut charcoal was added, gave results, under the same test conditions, similar to those of the silver oxalate.

It is believed that cupric, aurous, thallous, thallic, stannous, plumbous, cobaltic, ferric, manganic, and chromic oxalates can also be rendered suitable to use as controlled deflagratory compositions by the addition of carbon to them.

Having thus described the invention, what is claimed and desired to be secured by Letters Patent is:

1. A deflagratory composition consisting essentially of silver oxalate and powdered carbon wherein said powdered carbon comprises between about 3 and about 20%, by weight of the silver oxalate.

2. A deflagratory composition having a deflagration time between 1 and 3 seconds at about 350° F., consisting essentially of silver oxalate and about 20%, by weight of the silver oxalate, of activated charcoal.

3. A deflagratory composition consisting essentially of a metallic oxalate and powdered carbon, wherein the metallic cation is selected from the group consisting of chromium, cobalt, copper, gold, iron, lead, manganese, mercury, silver, thallium and tin, and wherein said powdered carbon comprises between about 3 and about 20 percent, by weight of the metallic oxalate.

References Cited in the file of this patent

UNITED STATES PATENTS 882,910    Reschke            Mar. 24, 1908

FOREIGN PATENTS 317,023    Great Britain        Aug. 8, 1929

OTHER REFERENCES

Chemical Abstracts I, vol. 47, No. 21, Nov. 10, 1953, page 11735 h. (Copy in Scientific Library.)

Chemical Abstracts II, vol. 50, No. 22, Nov. 25, 1956, page 17454 a. (Copy in Scientific Library.)